United States Patent
Slaight

(10) Patent No.: US 7,822,907 B2
(45) Date of Patent: Oct. 26, 2010

(54) METHODS AND APPARATUSES FOR SERIAL BUS SIDEBAND COMMUNICATIONS

(75) Inventor: Thomas Slaight, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 168 days.

(21) Appl. No.: 12/004,563

(22) Filed: Dec. 21, 2007

(65) Prior Publication Data

US 2009/0164690 A1 Jun. 25, 2009

(51) Int. Cl.
  *G06F 13/12* (2006.01)
  *G06F 15/16* (2006.01)
  *G06F 13/42* (2006.01)
  *G06F 13/36* (2006.01)

(52) U.S. Cl. .................. 710/311; 709/250; 710/306; 710/105; 710/313

(58) Field of Classification Search .................. 710/105, 710/306

See application file for complete search history.

(56) References Cited

U.S. PATENT DOCUMENTS

| 7,318,089 | B1 * | 1/2008 | Stachura et al. | 709/223 |
| 7,411,973 | B2 * | 8/2008 | McDaniel et al. | 370/463 |
| 2004/0179546 | A1 * | 9/2004 | McDaniel et al. | 370/463 |
| 2007/0115981 | A1 * | 5/2007 | Jreij et al. | 370/392 |
| 2008/0222151 | A1 * | 9/2008 | Mittapalli et al. | 707/8 |
| 2009/0100194 | A1 * | 4/2009 | Bhadri et al. | 709/244 |

OTHER PUBLICATIONS

Distributed Management Task Force; "Network Controller Sideband Interface (NC-SI) Specification"; Distributed Management Task Force; Jun. 26, 2007; Revision 1.0.0a; all pages.*

* cited by examiner

*Primary Examiner*—Ryan M Stiglic
(74) *Attorney, Agent, or Firm*—Schubert Law Group, PLLC; Garland D. Charpiot

(57) ABSTRACT

Methods and apparatuses that utilize a serial bus, such as a universal serial bus (USB), for communications between a communications network, a computing device, and an auxiliary device are disclosed. Some embodiments comprise methods handling sideband communications using serial buses. One or more of the embodiments comprise differentiating in-band data from out-of-band data, transferring information of the in-band data between a communications network and a computing device, and transferring information of the out-of-band data between the communications network and an auxiliary device. Some embodiments comprise an apparatus having a communications network interface, an auxiliary device interface, and a computing device interface. Of the interfaces, one or more may be a serial bus interface. The apparatus may differentiate between in-band and out-of-band data and communicate information of the out-of-band data to an auxiliary device. In some embodiments, the apparatus may also transfer control information. In some embodiments, information may be routed based upon cyclic redundancy check (CRC) information.

17 Claims, 5 Drawing Sheets

METHODS AND APPARATUSES FOR SERIAL BUS SIDEBAND COMMUNICATIONS

FIELD

The present invention is in the field of computing apparatuses that communicate with other apparatuses via communication networks. More particularly, the present invention relates to methods and apparatuses that utilize a serial bus, such as a universal serial bus, for communications between a communications network, a computing device, and an auxiliary device.

BACKGROUND

System management communication functions, for features such as Intel® Active Management Technology (Intel® AMT), require the ability to always access a system management processor or microcontroller in various system states, such as when the system is on or when the system is in a sleep mode. The communications related to accessing and communicating with the system may need to occur independently of the system processors and software. Such independent communications are commonly referred to as "out-of-band" communications. The term "sideband" is used in this context may refer to when "in-band" and "out-of-band" communications both occur over a common medium.

Existing network controllers used for system management communication functions may include sideband interfaces based on specific technologies. For example, a network controller may be based on a system management bus utilizing inter-integrated circuit technology (SMBus/I2C). Three other alternative technologies on which a network controller may be based include a technology referred to as fast management link (FML), a technology referred to as reduced media-independent interface (RMII), or another technology referred to as serial peripheral interface (SPI). Each of these technologies, when used to provide sideband communication capabilities, has certain drawbacks.

Of these interface technologies SMBus/I2C provides a low pin-count, such as two pins, and is widely available in third party management controllers. However, SMBus/I2C lacks sufficient speed for effective support of manageability functions such as media redirection and video redirection. FML is faster but still lacks sufficient speed for video redirection per its present definition and is proprietary in nature. Being proprietary means that it is generally not available in third party management controllers. RMII and RMII-based interfaces are available as a standard, have the bandwidth to support video and media redirection, and are available in some third party management controllers. Unfortunately, RMII and RMII-based interfaces require a relatively high pin-count, such as six or seven pins. Additionally, RMII-based interfaces generally cannot be routed more than eight to ten inches. Even further, existing network controllers using these technologies require that the management controllers remain powered while the system is in a low-power state even though the management controllers are inactive. This limitation causes problems meeting energy conservation standards and directives.

BRIEF DESCRIPTION OF THE DRAWINGS

Aspects of the embodiments will become apparent upon reading the following detailed description and upon reference to the accompanying drawings in which like references may indicate similar elements.

DETAILED DESCRIPTION OF EMBODIMENTS

Figure 1:
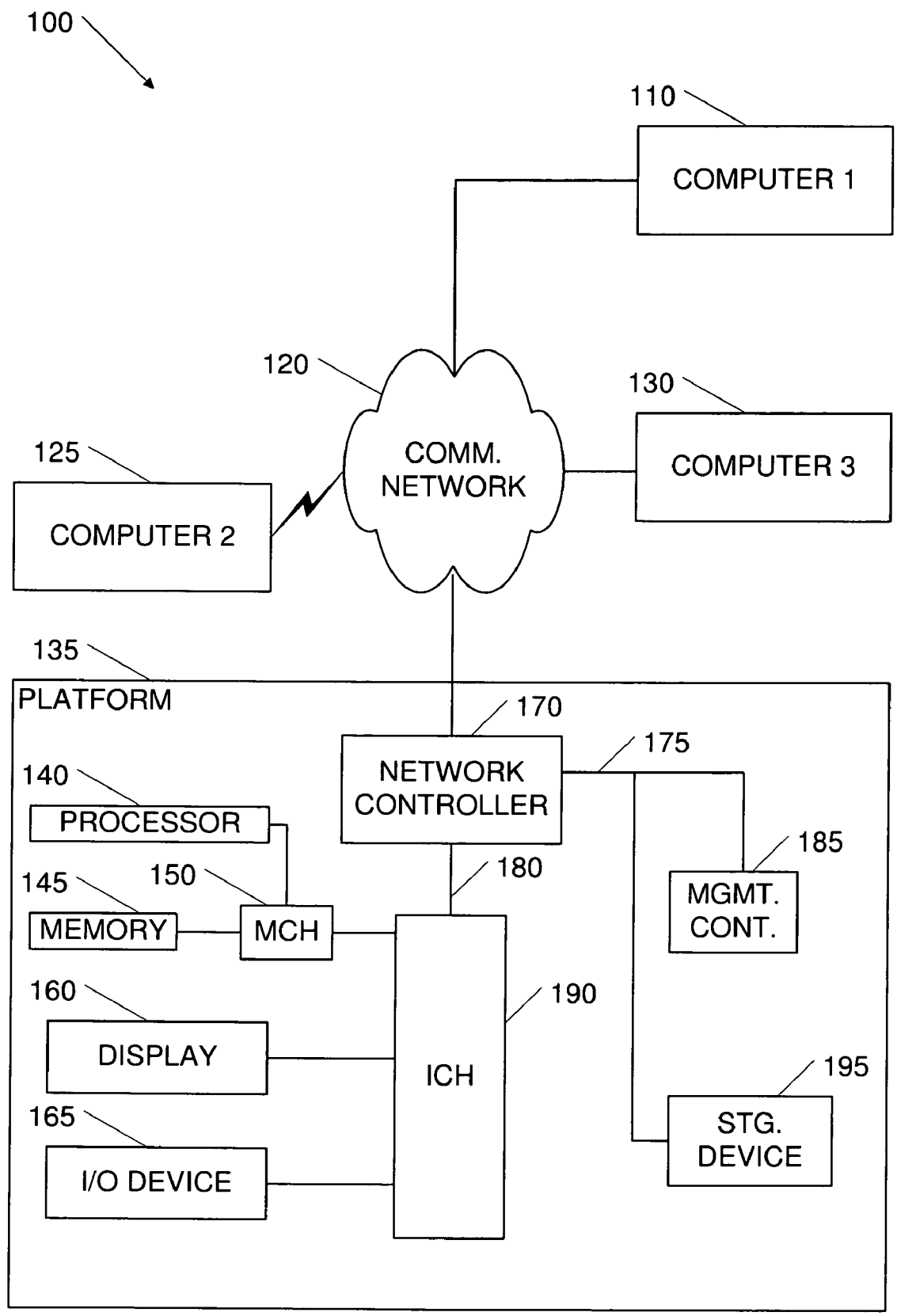
FIG. 1 depicts a platform having a management controller, coupled with a communications network via a network controller.

The following is a detailed description of example embodiments depicted in the accompanying drawings. The examples are in such detail as to clearly communicate the embodiments. However, the amount of detail offered is not intended to limit the anticipated variations of embodiments; but, on the contrary, the intention is to cover all modifications, equivalents, and alternatives falling within the spirit and scope of the present embodiments as defined by the appended claims. The detailed descriptions below are designed to make such embodiments obvious to a person of ordinary skill in the art.

Methods and apparatuses that utilize a serial bus, such as a universal serial bus (USB), for communications between a communications network, a computing device, and an auxiliary device are contemplated. Some embodiments comprise methods of handling sideband communications using serial buses. One or more of the embodiments comprise differentiating in-band data from out-of-band data, transferring information of the in-band data between a communications network and a computing device, and transferring information of the out-of-band data between the communications network and an auxiliary device. In such embodiments, one or more of the transfers may utilize a serial bus. Some embodiments may also multiplex information of the out-of-band data with other serial bus information via the serial bus. Other embodiments may also use two sets of input-output request packets (IRPs) for multiplexing the information, with one set of the IRPs associated with the out-of-band data. One or more alternative embodiments may include configuring a serial bus device coupled to the computing device via an out-of-band address space. Some embodiments may also include generating a first address of an in-band address space by using a cyclic redundancy check (CRC) process and generating a second address of the out-of-band address space using another CRC process.

Some embodiments comprise an apparatus having a communications network interface, an auxiliary device interface, and a computing device interface. Of the interfaces, one or more of interfaces may be a serial bus interface. In these embodiments, the apparatus may differentiate between in-band data and out-of-band data of a communications network and communicate information of the out-of-band data to an auxiliary device. One or more alternative embodiments may include a sideband module to transfer information between the auxiliary device and the communications network. In some of these alternative embodiments, the sideband module may transfer control information between the auxiliary device and a control processor of the apparatus. In other alternative embodiments, the control processor may communicate link control information with the auxiliary device via the serial bus interface.

In some embodiments, the communications network interface may have a packet filter module to help transfer information of the in-band data between the communications network and the computing device. The packet filter module may also help transfer information of the out-of-band data between the auxiliary device and the communications network. In one or more alternative embodiments, a wake signaling interface may respond to a wake condition, a wake message, or a wake signal, and wake the auxiliary device.

In various embodiments, the auxiliary device may be a management controller coupled to the apparatus via the serial bus interface. In one or more embodiments, the apparatus may be a network controller module with the computing device interface comprising a Peripheral Component Interconnect express™ (PCIe™) interface. In some embodiments, the communications network interface may comprise a serial bus interface having a routing module to route information between the communications network and the auxiliary device or between the communications network and the computing device based upon CRC information of the in-band data or the out-of-band data. In various embodiments, the apparatus may comprise a network controller that couples the communications network to the apparatus via a serial bus.

Some embodiments comprise an apparatus having a communications module to communicate information between a communications network and a computing device and communicate information between the communications network and an auxiliary device. In these embodiments, the communications module may communicate information for the computing device based on in-band data and communicate information for the auxiliary device based on out-of-band data. Also in these embodiments, the apparatus may communicate information of the out-of-band data to the auxiliary device by way of a serial bus.

In at least one alternative embodiment, the apparatus may include a wake mechanism to wake the auxiliary device. For example, the wake mechanism may include a wake signaling interface that may respond to a wake condition, a wake message, and/or a wake signal. In some embodiments, the auxiliary device coupled to the apparatus via the serial bus may be a management controller. In some embodiments, the communications module may comprise a network controller to be coupled to the computing device via the serial bus. The network controller may determine in-band endpoints and out-of-band endpoints from CRC information of the in-band data and the out-of-band data. In further alternative embodiments, the network controller may be coupled to a serial bus host controller interface (SBHCI) which processes input-output request packets (IRPs) associated with the out-of-band data.

Discussions for the embodiments described herein use the terms "sideband", "in-band", and "out-of-band" to describe the different ways in which data that may be communicated over a common medium. Since these terms may be interpreted differently, a short example illustrating the concepts they are intended to describe is now given. A communication channel, such as a channel of a serial bus, may allow the transfer of data between two devices using a standard protocol, or at least a predetermined protocol or communication methodology. As long as the two devices adhere to the standard or predetermined parameters of the protocol while communicating over the channel, the exchange of information may be referred to as "in-band". Conversely, one or more of the devices attached to the channel may attempt to communicate information using a nonstandard protocol, or at least a different protocol wherein one or more of the parameters do not comport with the standard protocol, and another device on the network is nonetheless able to understand the transmitted information despite the nonstandard protocol or the nonstandard parameters. Such exchange of information using the nonstandard protocol may be referred to as "out-of-band", meaning the communication occurs separately, or independently, from information communicated over the channel using the standard protocol. In other words, in-band communication may occur when using one protocol, while out-of-band communication may occur when a second protocol is used.

When two communication "bands" exist on a common communication medium, the term "sideband" communication may be used to describe the communication. Additionally, people skilled in the art frequently interchange the terms "out-of-band" and "sideband". In other words, people may use the terms "sideband communications" to describe communications that could otherwise be referred to as "out-of-band communications". Consequently, the two sets of terms may be frequently substituted for one another in the following discussions.

Many of the examples and discussions for the embodiments also use the terms "universal serial bus" and "USB" to refer to a type of bus in which data that may be communicated between two or more devices. The use of these terms is meant to be illustrative only. In other words, even though the discussions may only describe embodiments utilizing "universal serial bus" and "USB", other types of serial buses that are not universal serial buses are contemplated for embodiments.

The serial buses in various embodiments may have an asymmetric design, with a host, a numerous ports, and numerous peripheral devices connected in a tiered-star topology. Some embodiments may also include hubs in the tiers. An embodiment host may have multiple host controllers, with each host controller potentially providing one or more serial bus ports. Some embodiments may have a serial bus that automatically configures a network and/or allow peripherals to be hot swapped.

Various embodiments may connect up to 127 devices, including the hub devices, to a single host controller. One physical serial bus device of some embodiments may comprise several logical sub-devices, wherein the logical sub-devices are referred to as device functions. In numerous embodiments, serial bus device communication may be based on pipes, or logical channels, which may be connections from the host controller to a logical entity on the device named an endpoint, or pipe. Various embodiments may have 32 active pipes, such as 16 pipes into the host controller and 16 out of the controller. While some embodiments may have serial buses that support rates of 1.5 megabits per second (MBit/s) or 480 MBit/s, other embodiments may have serial buses that support even higher rates, such as 4.8 gigabytes per second or more.

An additional definition may help one interpret and understand the described embodiments. The term "interface" in the following discussions may describe hardware and/or software that facilitates the transfer of information from one component or device to another component or device. For example, an interface may comprise a module or collection of electronic components arranged to transfer information, which may comprise a series of ones and zeros, from one device to another. A more specific example of an interface may be a module that couples hardware of a communications network, such as an Ethernet cable or an Ethernet transmitter/receiver module, to one or more other modules or another interface. In other words, the interface may comprise a collection of electronic components that facilitate the transfer of information from the Ethernet network to another module or another type of interface, such as a PCIe™ interface or a USB interface.

Turning now to the drawings, FIG. 1 illustrates how an apparatus of a computing device may transfer information of in-band and out-of-band data between a communications network, the computing device, and an auxiliary device. As depicted in FIG. 1, a computing device such as platform 135 may be coupled to a communications network 120 in a system 100. Platform 135 may communicate with numerous other computing devices coupled to communications network 120, such as computers 110, 125, and 130. For example, computer 110 may comprise a computer on a local area network (LAN) or on a remote area network. Similarly, computer 125 may comprise a notebook, desktop, or server computer coupled to communications network 120 by way of a wireless networking card.

In different embodiments platform 135 may comprise a variety of different devices. For example, in one embodiment platform 135 may comprise a server computer. In other embodiments platform 135 may comprise a desktop, a notebook, a hand-held computer, or other type of computing device. Communications network 120 may take on a variety of different forms in different embodiments. In numerous embodiments communications network 120 may comprise one or more networking devices, such as network routers, hubs, switches, and wireless networking devices. Communications network 120 may comprise an isolated network, such as a LAN in a single building, which may have only one computer other than platform 135. In alternative embodiments, communications network 120 may comprise a wide area network or the Internet. For example, computer 110 may comprise a computer on a LAN, remotely located but able to communicate with platform 135 via the Internet. As illustrated by FIG. 1, platform 135 may transfer information of in-band and out-of-band data between remote and/or local computers connected to communications network 120.

In addition to the various types of networking hardware that may couple a computing device, such as platform 135, to other computing devices, the method of the communication, such as the communication protocol, may also vary in alternative embodiments. For example, network controller 170 of platform 135 may communicate with other computing devices using one or more protocols, such as a remote management control protocol (RMCP) or a Transmission Control Protocol (TCP) and Internet Protocol (IP). In alternative embodiments, network controller 170 may utilize other communication protocols that conform to open or proprietary standards. For example, network controller 170 may communicate with computer 125 using Open Systems Interconnection (OSI), DECnet™, IPX/SPX™, or other protocols.

Platform 135 may comprise numerous components or devices that may be placed in one or more power conservation modes. For example, platform 135 has a processor 140. In some embodiments, processor 140 may comprise a single core processor, while in other embodiments processor 140 may comprise a multiple-core processor. Processor 140 may be coupled to a memory controller hub (MCH) 150. Processor 140 may be capable of executing operating instructions, such as instructions of user applications or an operating system, in memory 145 by interacting with MCH 150. MCH 150 may also couple processor 140 with an input-output (I/O) controller hub (ICH) 190. ICH 190 may allow processor 140 to interact with other platform components, such as display 160 or input-output (I/O) device 165. Processor 140, MCH 150, memory 145, and ICH 190 may all be able to enter one or more power conservation modes, individually or in various combinations. For example, platform 135 may comprise a desktop computer in a business office wherein a user places platform 135 into a sleep mode before going home for the evening. Once in the sleep mode, platform 135 may utilize an apparatus such as network controller 170 to monitor communication packets of communications network 120 for wake events, such as a wake request. For example, network controller 170 may monitor communication packets of communications network 120 for wake events intended to wake platform 135 or an auxiliary device of platform 135, such as management controller 185.

Management controller 185 may collect and store information pertaining to platform 135. The information collected and stored by management controller 185 may allow an information technology (IT) administrator or an IT technician to perform a variety of management events or management tasks. In other words, the information may allow the IT technician to examine, repair, and maintain platform 135 from a remote location, such as by using a remote management console which may be computer 110, 125, or 130. For example, the IT technician may examine the hardware and software information stored in non-volatile memory of management controller 185 and determine the asset and/or equipment serial numbers of platform 135. The IT technician may also examine the hardware and software information to repair platform 135 after an operating system crash. In other words, the information stored by management controller 185 may allow the IT technician to perform a variety of different tasks or management events, via a remote console, with the above examples being only a few.

To allow a person, such as an IT administrator, to perform a management event of platform 135, management controller 185 may communicate with one or more remote consoles such as computer 110 via an apparatus such as network controller 170. In one or more embodiments, network controller 170 may allow platform 135 to communicate with other computing devices on communications network 120 using in-band data. Network controller 170 may also allow management controller 185 to communicate with the computing devices coupled to communications network 120 using out-of-band data. That is to say, network controller 170 may be shared for both communications of management controller 185 and the system communications for platform 135, using both out-of-band data and in-band data. The physical form of network controller 170 may vary from an embodiment to embodiment. For example, in one embodiment network controller 170 may comprise an embedded LAN controller, yet comprise a communications an add-in card in another embodiment, such as a peripheral component interconnect (PCI) card.

Platform 135 may be configured to present information to a user via display 160. For example, display 160 may comprise a computer monitor coupled to an Advanced Graphics Port (AGP) video card. I/O device 165 may comprise a keyboard, a mouse, a trackball, a touch-pad, an audio input device, a scanner, one or more computer speakers, or a touch-screen and stylus, as examples. Storage device 195 may comprise a USB flash memory drive, a Serial ATA (SATA) device, or an Advanced Technology Attachment (ATA) device, such as an ATA hard drive, a compact disc drive, or a digital versatile disc drive. In other words, storage device 195 may comprise one or more USB network storage drives coupled to platform 135 by way of a USB link 175 provided by network controller module 170.

Network controller 170 may monitor communication packets of communications network 120 for wake events intended to wake storage device 195. Upon receiving such a wake packet, network controller 170 may wake storage device 195 using out-of-band communications. Such a scenario may be useful when platform 135 has entered a power conservation mode and a systems administrator desires to perform some type of maintenance activity. For example, a systems administrator may use a remote computer, such as computer 130, to upgrade software stored on storage device 195. The system administrator may send a wake packet to platform 135 to bring it out of the power conservation mode and activate numerous system components, such as processor 140 and memory 145. Network controller 170 may then transfer information back and forth between computer 130 and network controller 170 using in-band data. For example, network controller 170 may then transfer in-band data to and from components of platform 135 via ICH 190. Network controller 170 may also transfer out-of-band data to and from one or more auxiliary devices, such as management controller 185 and/or storage device 195.

The embodiment of platform 135 shown in FIG. 1 may comprise a desktop computer, a notebook computer, or a portable computing device such as a palm-held computer. In alternative embodiments, platform 135 may comprise a variety of other computing devices or apparatuses. In numerous embodiments, platform 135 may comprise part of a consumer electronic device. For example, platform 135 may comprise a multimedia device in the home of a consumer, such as a networked personal video recorder (PVR) or digital video recorder (DVR), or a networked audio player capable of streaming audio. In further embodiments, platform 135 may comprise a digital surveillance video camera system or even a smart appliance coupled to a communication network.

Figure 2:
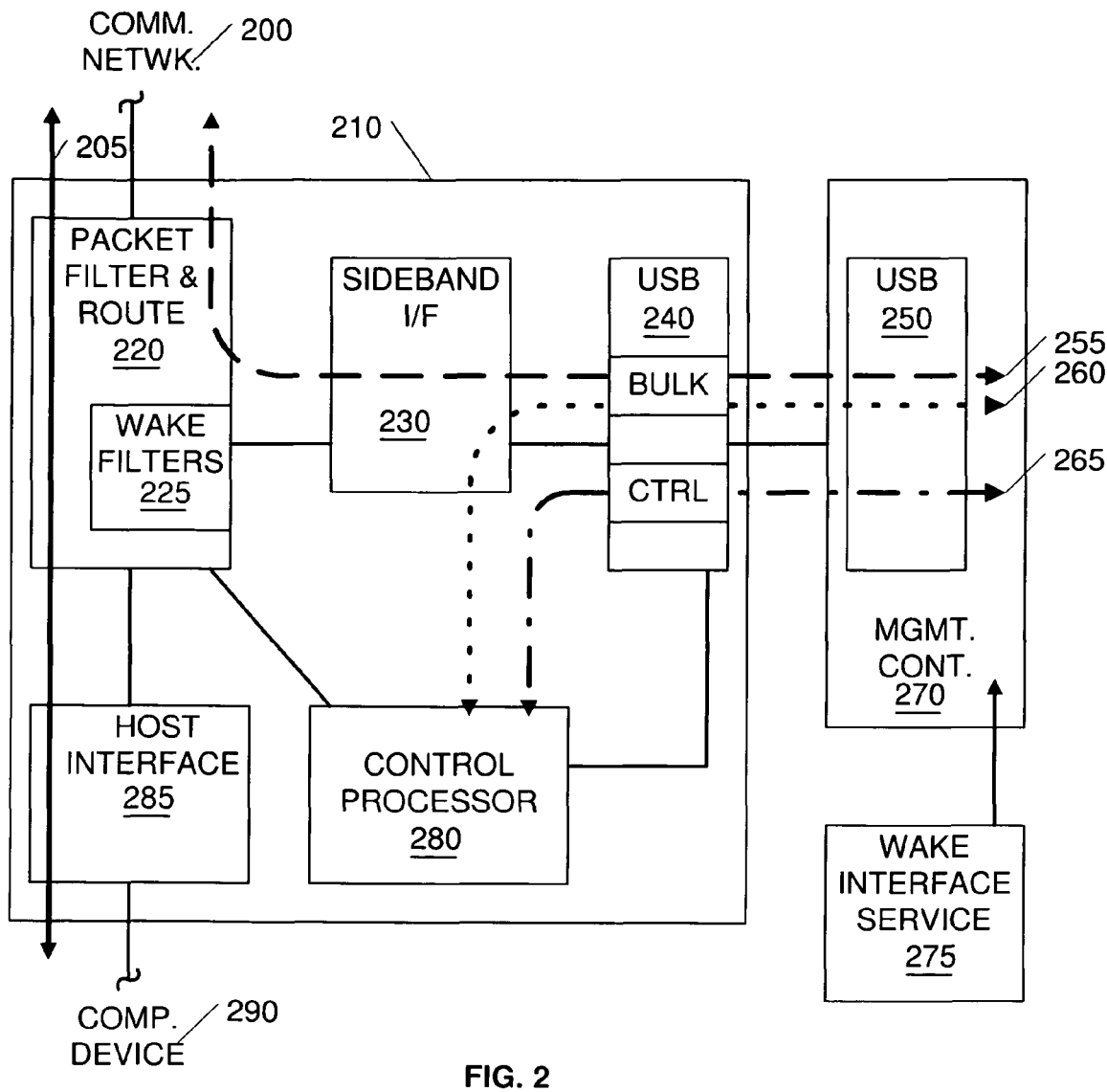
FIG. 2 illustrates how an apparatus may transfer information of in-band and out-of-band data between a communications network, a computing device, and an auxiliary device coupled to the apparatus via a universal serial bus.

To further illustrate how an embodiment of an apparatus may transfer information of in-band data and out-of-band data between a communications network, a computing device, and an auxiliary device coupled to the apparatus via a universal serial bus, we turn to FIG. 2. FIG. 2 depicts an embodiment of an apparatus 210. Apparatus 210 may comprise a network controller card, a communications module, or alternatively a chip or set of integrated circuit chips for communications, in a server or a desktop computer, as examples. Apparatus 210 may be affixed to the motherboard of the computer or otherwise coupled with the computer, such as a peripheral card that inserts into a motherboard. For example, apparatus 210 may comprise a network module controller embedded in a motherboard of a computing device, such as network controller 170 in platform 135, shown in FIG. 1. For example, communications network 200 in FIG. 2 may correspond to communications network 120 of FIG. 1. Similarly, computing device 290 may correspond to platform 135, wherein ICH 190 would couple to apparatus 210 via link 180. As for the auxiliary device, apparatus 210 is coupled with management controller 270 in the embodiment of FIG. 2. Continuing with our example, management controller 270 of FIG. 2 may correspond to management controller 185 in FIG. 1. With apparatus 210 being coupled to management controller 270 via a universal serial bus (or other type of serial bus), the USB link between USB interface module 240 and USB interface module 250 may, for example, correspond to USB link 175 between network controller 170 and management controller 185.

As shown in FIG. 2, apparatus 210 has a sideband interface module 230. Sideband interface module 230 may work in conjunction with USB interface module 240 to provide a "sideband" interface for apparatus 210. The term "sideband interface" in this context may refer to the ability for apparatus 210 to recognize and route packets to and from communications network 200 where the packets come from either management controller 270 or from computing device 290 via a host interface 285. A routing module, such as packet filter module 220, may allow apparatus 210 to recognize whether traffic from communications network 200 is in-band or out-of-band and route or communicate that traffic accordingly, in order to support the sideband communication. For example, packet filter module 220 may contain logic that recognizes aspects of the packets, such as the internet protocol (IP) address, the port type, etc., and use that information to route the packet to computing device 290 and/or management controller 270 as appropriate.

Referring to FIG. 2, packet filter module 220 may detect in-band data 205 based on certain aspects of the packets and transfer the associated information to computing device 290 via host interface 285. Packet filter module 220 may detect out-of-band data 255 based on certain aspects of the packets and transfer the associated information of the out-of-band data to and from management controller 270 via sideband interface module 230 and USB module 240. Apparatus 210 may differentiate the in-band data from the out-of-band data and transfer the information between communications network 200 and management controller 270 in a manner that is transparent to computing device 290, and vice versa. In other words, computing device 290 may be unaware of the traffic to/from management controller 270, and management controller 270 may be unaware of the traffic going to/from computing device 290.

In addition to USB interface module 240 providing a physical termination, USB interface module 240 may also provide USB endpoints for supporting the sideband communication functions. For example, USB interface module 240 may provide the packet functions related to USB communications and provide the routing of endpoint and/or pipe traffic to and from blocks within the apparatus 210 and/or management controller 270. For example, USB interface module 240 may provide for control transfers, generate token and data packets, etc. USB interface module 240 may also support other types of communication traffic. For example, the embodiment of apparatus 210 may provide link control traffic 265, sideband control traffic 260, and pass-through traffic or out-of-band data (traffic) 255.

Link control traffic 265 may comprise traffic related to the setup and/or configuration of the USB communication link between USB interface module 240 and USB interface module 250. For example, link control traffic 265 may include support for USB configuration and interface descriptors. Sideband control traffic 260 may relate to the setup and configuration of packet filtering and routing functions for packet filter module 220. Pass-through traffic, or out-of-band data 255, may comprise traffic that carries the network packet data, or at least information of the packet, to and from management controller 270. For example, the out-of-band information may comprise systems management information sent from a systems administrator operating a remote management console to management controller 270.

As alluded to earlier, sideband interface module 230 may comprise a hardware and/or software module that differentiates between out-of-band data and sideband control packets and routes them accordingly. Control processor 280 may comprise hardware and/or software that provides intelligence and control for apparatus 210. For example, control processor 280 may comprise a microcontroller in a network controller, which may be implemented as an embedded microcontroller core, which processes sideband control messages and link control messages for apparatus 210. In different embodiments, the traffic for the out-of-band and the sideband control messaging may be implemented differently. For example, the traffic for the out-of-band and the sideband control messaging may be provided by USB interface module 240 using shared endpoints. In another embodiment the traffic for the out-of-band and the sideband control messaging may be provided using separate endpoints.

As described earlier, management controller 270 may be part of a motherboard for computing device 290. Management controller 270 may be partially or fully powered down with other parts of computing device 290 to conserve energy. However, many system management communication functions, for features such as Intel® AMT, require the ability to always access a system management microcontroller, like management controller 270, regardless of the state of computing device 290. To address this need, USB interface module 250 may provide wake capabilities or a wake mechanism that can be used in conjunction with apparatus 210 to wake management controller 270. In other words, USB interface module 250 may allow computing device 290 to save additional system power when the link provided by USB interface modules 240 and 250 does not need to be active with management controller 270.

To provide this wake capability, an alternative embodiment of apparatus 210 may include wake filters module 225 and potentially wake interface service module 275. That is to say, some embodiments may include wake filters module 225 and/or wake interface service module 275, while other embodiments may not include one or more of them. As illustrated by FIG. 2, apparatus 210 may have two elements that work together and provide the wake capability for management controller 270. The first element, wake filters module 225, may be integrated into apparatus 210. The second element, which may comprise a wake signaling interface, may be implemented using hardware and/or software functionality provided by USB interface modules 240 and 250. The wake signaling interface may respond to one or more of the following elements: a wake condition, a wake message, or a discrete wake signal. For example, a wake message may comprise a message sent from a remote management console. A wake condition or a wake signal may comprise a condition or signal generated by control processor 280 and/or computing device 290. This wake filter functionality, provided by USB interface modules 240 and 250, may remain active during all system power states, including states such as sleep and hibernation. Consequently, wake filters module 225 may then constantly monitor communications network 200 for packet patterns intended to wake management controller 270.

Wake filters module 225 may vary from embodiment to embodiment. For example, in one embodiment wake filters module 225 may be pre-configured. In another embodiment, wake filters module 225 may be configured by management controller 270 via the sideband link provided by out-of-band data (traffic) 255 and sideband control traffic 260.

Once packet filter module 220 and wake filters module 225 detect and filter a wake pattern from packets sent over communications network 200, apparatus 210 may wake management controller 270. Apparatus 210 may generate a wake condition via sideband interface module 230. Depending on the embodiment, the wake condition may comprise a special data pattern or electrical transition generated by sideband interface module 230. For example, the wake condition may be defined according to the requirements of USB interface module 240. Management controller 270 may directly interpret this condition. In an alternative embodiment, the wake condition may be recognized by a separate wake interface service module 275, such as a wake interface service chipset, that subsequently wakes management controller 270 via a wake signal line. For example, a wake signal line from wake interface service module 275 may be necessary in embodiments where management controller 270 cannot interface to the wake condition or message directly.

In an alternative embodiment, the wake condition may comprise a wake message that is delivered via sideband interface module 230. In such an embodiment, management controller 270 may have logic that recognizes the wake message and wakes the rest of management controller 270. Alternatively, wake interface service module 275 may recognize the wake message wherein wake interface service module 275 may subsequently wake management controller 270 via a wake signal line. In a further alternative embodiment, the wake condition may comprise a separate wake signal generated directly by apparatus 210. In other words, apparatus 210 may detect the wake event and wake management controller 270 via a direct wake signal line.

As FIG. 2 illustrates, sideband interface module 230 and USB interface module 240 may comprise an embedded sideband interface in an apparatus, such as a network controller. Also, as described in the discussion for FIG. 2, USB routing functions may be defined for a common control processor that handles configuration and control for both a USB link, provided by USB interface modules 240 and 250, and sideband messaging and/or control traffic over a universal serial bus. As the discussion for apparatus 210 further illustrates, hardware routing functions to/from a USB and a control processor may also be defined and integrated into a single apparatus, such as a network controller. In other words, apparatus 210 integrates the hardware routing functions, a USB, and other sideband support functions in a single device. Even so, alternative embodiments may perform the functions of apparatus 210 using multiple devices. For example, one embodiment may implement a host interface 285 in a single chip, while implementing packet filter module 220, sideband interface module 230, control processor 280, and USB interface module 240 in another chip.

Figure 3:
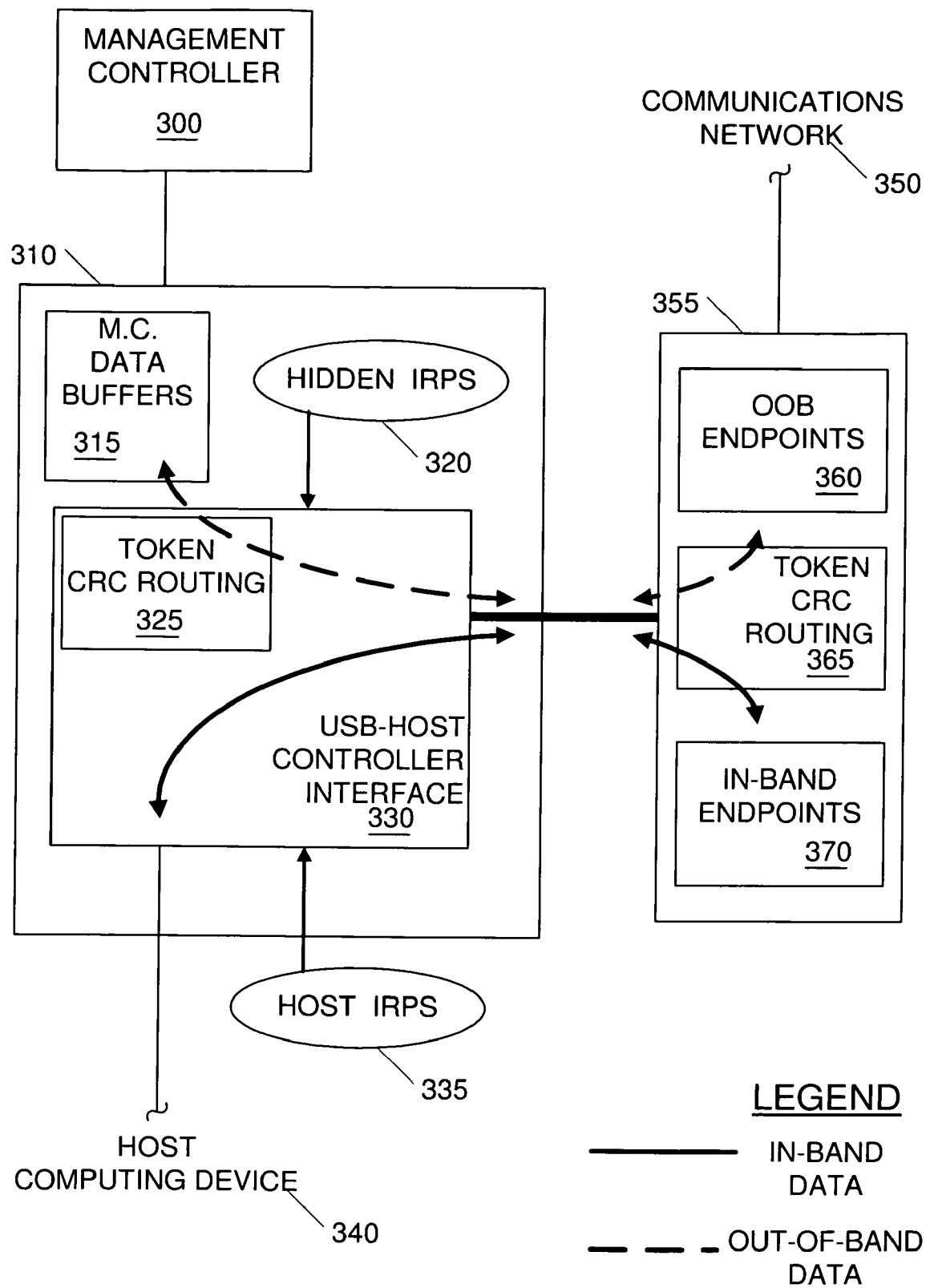
FIG. 3 illustrates how an alternative embodiment of an apparatus may transfer information of in-band and out-of-band data between a communications network, a computing device, and an auxiliary device.

FIG. 3 illustrates how an alternative embodiment of an apparatus 310 may transfer information of in-band and out-of-band data, or communication streams, between a communications network 350, a computing device 340, and an auxiliary device such as management controller 300. Token CRC routing module 325 of USB-host controller interface 330 may comprise a logic block that recognizes free or available packet intervals within the data stream between computing device 340 and in-band communication endpoints of a universal serial bus 345 and injects and extracts out-of-band packets into and from those intervals. In one or more embodiments, USB 345 may require periodic frame transmissions, even though there is no data being sent. In various embodiments, point-to-point applications may be used to create or reserve in-band bandwidth requirements. Reserving bandwidth in this manner may help ensure that there are free slots or free packet intervals by having a device, such as apparatus 355, request only a portion of the available or reserved bandwidth of USB 345. The remaining slots, then, may be available for the out-of-band traffic to apparatus 310 and the auxiliary device, in this case management controller 300 by way of management control data buffers 315.

Apparatus 310 and/or apparatus 355 may use the CRC field for the USB address token packet as the means to enable a second address space for out-of-band traffic/data. Apparatuses 310 and 355 may route packets upon the detection of a valid CRC per two different processes. One process may comprise a process specified by a USB standard. A second process may comprise an alternative process, which may be referred to as "CRC2", and used for the sideband/out-of-band communications. As shown in FIG. 3, token CRC routing modules 325 and 365 may provide the different routing based on the difference in the CRC calculation.

Per USB specifications, the addressing information that selects a given USB device may be passed in an address token packet that and be required to have a valid token CRC value. Otherwise, the intermediate USB device handling the packet may ignore or drop the packet. However, this response may enable one or more devices to use the CRC field as a way to differentiate between the in-band and out-of-band packets or data. For example, in-band packets may use the USB-specified CRC process while out-of-band or sideband packets use a different CRC process. USB devices that comply with the USB standard may ignore the packet transactions that are preceded by an invalid token. Having the second address space, an out-of-band address space, may provide a couple benefits. One benefit may be the ability for out-of-band (OOB) devices or endpoints 260 to be separately configured and enumerated without concern of conflict with host-assigned addresses or transaction visibility by the host for in-band endpoints 370. Another benefit may be that only a small modification to the handling of the CRC may be required to identify the sideband, or out-of-band traffic. That is to say, much or most of the USB interface operation may remain unchanged from the USB specification.

Apparatus 310 may transfer information of in-band and out-of-band data by multiplexing traffic using USB-host controller interface 330. USB-host controller interface 330 may multiplex the traffic by implementing a set of "hidden IRPs" (element 320) that USB-host controller interface 330 merges into a processing queue along with host IRPs 335 that may be configured by the host controller driver software running under the operating system of computing device 340. By complementing host IRPs 335 with hidden IRPs 320, apparatus 310 may benefit from the IRP processing capabilities and architecture of USB-host controller interface 330. One should note that the embodiment illustrated in FIG. 3 is just one implementation of a multiplexing or interleaving function that may take out-of-band and in-band transaction requests and merge and/or extract those transactions onto and from the shared USB connection. Alternative embodiments may involve additional logic blocks, perform additional or different functions, or use a different technique to accomplish the multiplexing.

Figure 4:
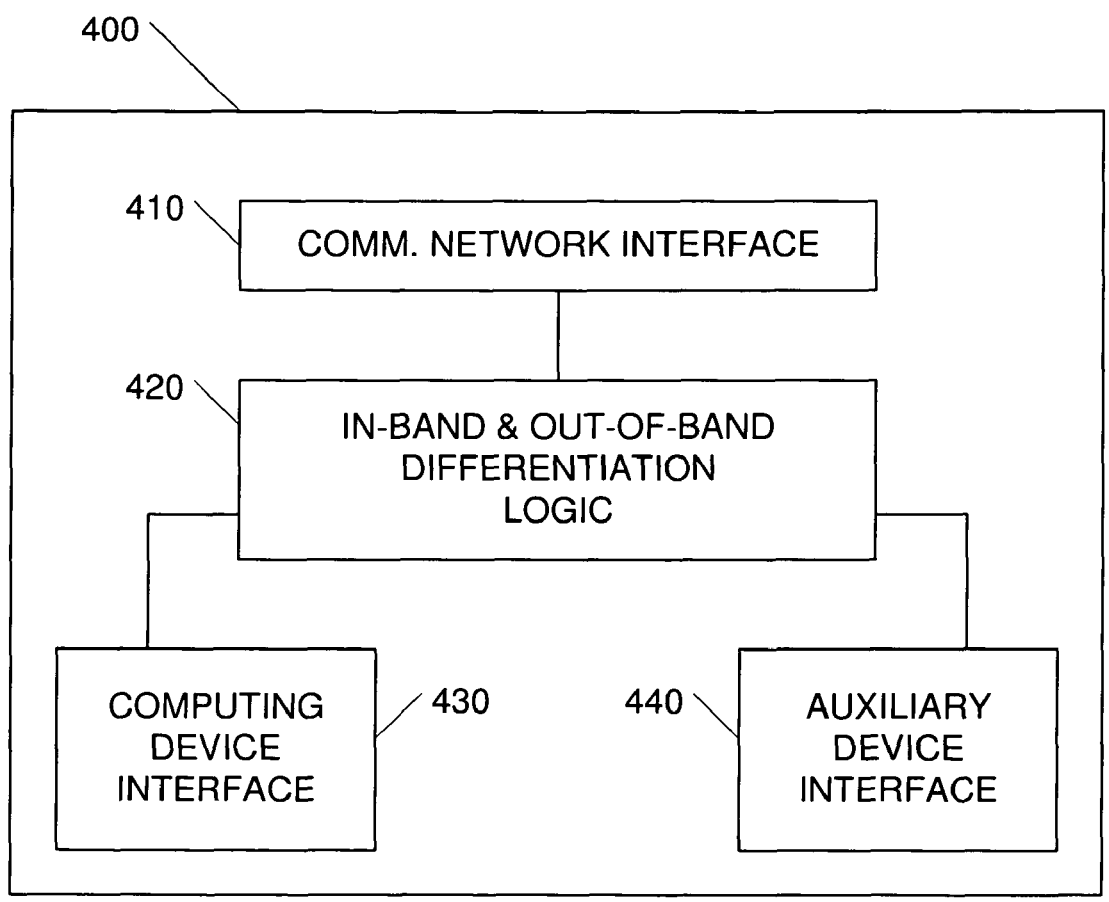
FIG. 4 depicts an apparatus that may differentiate between in-band data and out-of-band data of a communications network, and communicate information between a computing device or an auxiliary device based on the differentiation.

FIG. 4 depicts an apparatus 400 that may differentiate between in-band and out-of-band data of a communications network. Similar to apparatus 210 depicted in FIG. 2 and apparatus 310 depicted in FIG. 3, apparatus 400 may communicate information between a computing device, such as platform 135, or an auxiliary device, such as management controller 185 or storage device 195, based on the differentiation between the in-band and out-of-band data of a communications network, such as communications network 120. Apparatus 400 may comprise a hardware module, or a combination of a hardware module/device and software such as firmware. For example, in one or more embodiments, differentiation logic module 420 may comprise a processor or microcontroller executing instructions stored in nonvolatile memory. In alternative embodiments, differentiation logic module 420 and/or other modules of apparatus 400 may comprise only hardware elements arranged in a manner to form a state machine.

Apparatus 400 may monitor communication packets transmitted via the communications network coupled to communications network interface 410. For example, apparatus 400 may monitor communication packets transferred to communications network interface 410, sent by an IT administrator from a remote management console. The IT administrator may want to perform some type of management-related function via a management controller coupled to auxiliary device interface 440. Additionally, the IT administrator may want to perform the management-related function while the computing apparatus coupled to apparatus 400 is being operated by computer user. For example, the computer user may be surfing the Internet using a web browser application that is sending and receiving information to the Internet via communications network interface 410.

In order to allow the IT administrator to perform the management-related function while the computer user surfs the Internet, differentiation logic module 420 may differentiate the communications intended for the computing device coupled to computing device interface 430 from the communications intended for the management controller coupled to auxiliary device interface 440. Differentiation logic module 420 may differentiate between the two sets of information by communicating the information for each set within its own band. Continuing with our example above, differentiation logic module 420 may receive data transmitted from the Internet and transfer that data to computing device interface 430 using a first band so that it may be displayed to the computer user surfing the Internet. In contrast, differentiation logic module 420 may receive data transmitted from the remote console of the IT administrator and transfer that data to auxiliary device interface 440 using out-of-band data. For example, differentiation logic module 420 may use a first CRC process to generate and/or recognize token addresses for the in-band packets transferred to and from computing device interface 430. Differentiation logic module 420 may use a second CRC process to generate and/or recognize token addresses for the out-of-band packets associated with auxiliary device interface 440.

One or more of the interfaces of apparatus 400 may comprise USB-enabled interfaces. For example, in one embodiment auxiliary device interface 440 may use a USB when communicating with the auxiliary device coupled to auxiliary device interface 440. In another embodiment, differentiation logic module 420 may be coupled to communications network interface 410 using a USB link. In a further embodiment, computing device interface 430 may be coupled with differentiation logic 420 using a USB link.

Figure 5:
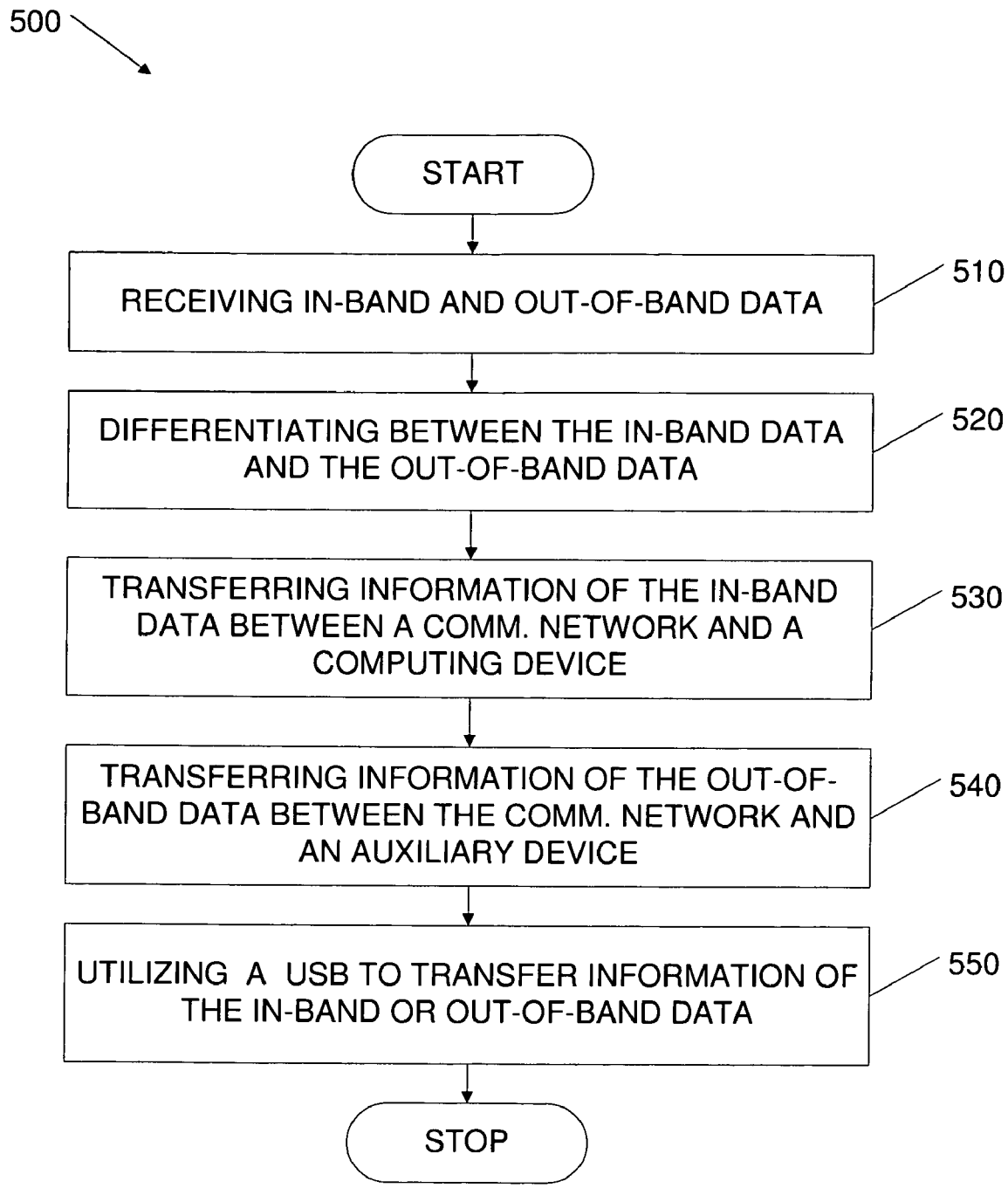
FIG. 5 illustrates a method for handling sideband communications using a universal serial bus.

FIG. 5 illustrates a method for handling sideband communications using a universal serial bus. Flowchart 500 begins with receiving in-band data and out-of-band data (element 510) and differentiating between the in-band data in the out-of-band data (element 520). For example, network controller 170 may comprise a peripheral card inserted into platform 135. Network controller 170 may receive in-band data from ICH 190 (element 530) and receive out-of-band data from storage device 195 (element 540) and transfer both sets of data, or information provided by that data, to communications network 120 (elements 530 and 540).

A method and according to flowchart 500 may continue by utilizing a USB to transfer information of the in-band or out-of-band data (element 550). For example, link 175 coupling network controller 170 to management controller 185 and storage device 195 may comprise a USB link. Alternatively, link 180 may also comprise a USB link. In other words, network controller 170 may be coupled to management controller 185, storage device 195, and/or ICH 190 via one or more USB interfaces.

The elements described for a method according to flowchart 500 may comprise the elements of one embodiment. Other embodiments may include more elements or fewer elements. For example, an alternative embodiment may include encrypting data or information of the in-band and out-of-band packets before transferring them to communications network 120.

Another embodiment of the invention is implemented as a program product for use with a computing device or platform to process in-band and out-of-band data with a USB. The program(s) of the program product defines functions of the embodiments (including the methods described herein) and can be contained on a variety of data and/or signal-bearing media. Illustrative data and/or signal-bearing media include, but are not limited to: (i) information permanently stored on non-writable storage media (e.g., read-only memory devices within a computer such as CD-ROM disks readable by a CD-ROM drive); (ii) alterable information stored on writable storage media (e.g., floppy disks within a diskette drive or hard-disk drive); and (iii) information conveyed to a computer by a communications medium, such as through a computer or telephone network, including wireless communications. The latter embodiment specifically includes information downloaded from the Internet and other networks. Such data and/or signal-bearing media, when carrying computer-readable instructions that direct the functions of the present invention, represent embodiments of the present invention.

In general, the routines executed to implement the embodiments of the invention, may be part of an operating system or a specific application, component, program, module, object, or sequence of instructions. The computer program of the present invention typically is comprised of a multitude of instructions that will be translated by a computer into a machine-readable format and hence executable instructions. Also, programs are comprised of variables and data structures that either reside locally to the program or are found in memory or on storage devices. In addition, various programs described hereinafter may be identified based upon the application for which they are implemented in a specific embodiment of the invention. However, it should be appreciated that any particular program nomenclature that follows is used merely for convenience, and thus the invention should not be limited to use solely in any specific application identified and/or implied by such nomenclature.

It will be apparent to those skilled in the art having the benefit of this disclosure that the present invention contemplates methods, apparatuses, and computer program products that process information of a communications network using in-band and out-of-band data with a USB. It is understood that the form of the invention shown and described in the detailed description and the drawings are to be taken merely as examples. It is intended that the claims be interpreted broadly to embrace all the variations of the embodiments disclosed.

Although the present invention and some of its aspects have been described in detail for some embodiments, it should be understood that various changes, substitutions and alterations can be made herein without departing from the spirit and scope of the invention as defined by the appended claims. Although an embodiment of the invention may achieve multiple objectives, not every embodiment falling within the scope of the attached claims will achieve every objective. Moreover, the scope of the present application is not intended to be limited to the particular embodiments of the process, machine, manufacture, composition of matter, means, or methods described in the specification. As one of ordinary skill in the art will readily appreciate from the disclosure of the present invention, processes, machines, manufacture, compositions of matter, means, or methods, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, or methods.

What is claimed is:

1. A method, comprising:
    receiving, at a single channel of a network apparatus, in-band data and out-of-band data from a communications network;
    transmitting, by the network apparatus, in-band data and out-of-band data to the communications network via the single channel;
    separating, in the network apparatus, in-band data from out-of-band data for data received from the communications network;
    generating a first address token packet of an in-band address space via a first cyclic redundancy check (CRC) process and generating a second address token packet of the out-of-band address space via a second CRC process;
    transferring, by the network apparatus, information of the in-band data between the communications network and a computing device; and
    transferring, via a universal serial bus (USB) interface module in the network apparatus, information of the out-of-band data between the communications network and a management controller based on the first and second address token packets.

2. The method of claim 1, further comprising multiplexing information of the out-of-band data and other serial bus information via the serial bus.

3. The method of claim 2, wherein the multiplexing comprises using two sets of input-output request packets (IRPs), wherein one of the two sets of IRPs is associated with the out-of-band data.

4. The method of claim 1, further comprising configuring a serial bus device coupled to the computing device via the out-of-band address space, wherein the transferring the information of the out-of-band data comprises transmitting the information of the out-of-band data via a universal serial bus (USB) interface module operatively coupled to a control processor.

5. An apparatus, comprising:
    a first interface configured to couple the apparatus with a communications network, wherein the first interface enables the apparatus to transmit and receive both in-band data and out-of band data through a single channel of communication;
    a second interface configured to couple the apparatus with an auxiliary device;
    a third interface configured to couple the apparatus with a computing device; and
    a universal serial bus (USB) interface module communicatively coupled to the first interface and the second interface, wherein the apparatus is arranged to differentiate between in-band data and out-of-band data received from the first interface and transfer the received out-of-band data to the auxiliary device via the USB interface module, wherein further the apparatus is arranged to transmit the received in-band data to the computing device via the third interface, wherein further the USB interface module communicatively couples the first interface with the second and third interfaces, wherein further the USB interface module comprises a routing module to route information between the communications network and the auxiliary device or the computing device based upon cyclic redundancy check (CRC) information of the in-band data or the out-of-band data.

6. The apparatus of claim 5, further comprising a sideband module configured to transfer information between the auxiliary device and the communications network via the USB interface module.

7. The apparatus of claim 6, wherein the sideband module is arranged to transfer control information between the auxiliary device and a control processor of the apparatus via the USB interface module.

8. The apparatus of claim 7, wherein the control processor is arranged to communicate link control information with the auxiliary device via the USB interface module, wherein further the auxiliary device is a management controller.

9. The apparatus of claim 5, wherein the first interface comprises a packet filter module, wherein further the packet filter module is arranged to transfer information of the in-band data between the communications network and the computing device and transfer information of the out-of-band data between the auxiliary device and the communications network.

10. The apparatus of claim 9, further comprising a wake signaling interface to wake the auxiliary device, wherein the wake signaling interface responds to at least one of a wake condition, a wake message, and a wake signal.

11. The apparatus of claim 10, wherein the auxiliary device comprises a management controller coupled to the apparatus via the USB interface module.

12. The apparatus of claim 5, wherein the apparatus comprises a network controller module, with the third interface comprising a peripheral component interconnect express (PCIe™) interface.

13. The apparatus of claim 5, further comprising a network controller, the network controller to couple the communications network to the apparatus via a serial bus.

14. An apparatus, comprising:
a communications module to communicate information between a communications network and a computing device and communicate information between the communications network and an auxiliary device, wherein the communications module is arranged to communicate information for the computing device based on in-band data and to communicate information for the auxiliary device based on out of-band data, wherein further the apparatus is configured to communicate information of the out-of-band data to the auxiliary device via a serial bus, wherein further the apparatus is configured to communicate both in-band data and out-of-band data to and from the communications network over a single channel of communication, wherein further the communications module comprises a network controller to be coupled to the computing device via the serial bus, the network controller arranged to determine in-band endpoints and out-of-band endpoints from cyclic redundancy check (CRC) information of the in-band data and the out-of-band data.

15. The apparatus of claim 14, further comprising a wake mechanism to wake the auxiliary device, wherein the wake mechanism comprises a wake signaling interface that responds to at least one of a wake condition, a wake message, and a wake signal.

16. The apparatus of claim 14, wherein the auxiliary device comprises a management controller coupled to the communications network via the serial bus.

17. The apparatus of claim 14, wherein the network controller to be coupled to a serial bus host controller interface (SBHCI), the SBHCI arranged to process a set of input-output request packets (IRPs) associated with the out-of-band data.

* * * * *